(12) United States Patent
Foster (10) Patent No.: US 6,394,662 B1
(45) Date of Patent: May 28, 2002

(54) OPTICAL FIBRE CONNECTOR

(75) Inventor: Nigel Stewart Foster, Southampton (GB)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/544,766

(22) Filed: Apr. 7, 2000

(30) Foreign Application Priority Data

Apr. 9, 1999 (GB) .............................. 9908177
Apr. 9, 1999 (GB) .............................. 9908178
Apr. 9, 1999 (GB) .............................. 9908180
Apr. 9, 1999 (GB) .............................. 9908182

(51) Int. Cl.⁷ ........................ G02B 6/38; H01R 13/52
(52) U.S. Cl. ..................... 385/60; 385/70; 439/271
(58) Field of Search ........................ 385/60, 56, 62, 385/70, 73, 78; 439/271

(56) References Cited

U.S. PATENT DOCUMENTS

| 3,990,779 | A | * | 11/1976 | McCartney | ............... | 385/70 |
| 4,213,464 | A | * | 7/1980 | Katz et al. | ............... | 248/430 |
| 4,711,520 | A | * | 12/1987 | Bernardini | ............... | 385/59 |
| 5,095,725 | A | | 3/1992 | Wada et al. | ............... | 72/32 |
| 5,138,217 | A | | 8/1992 | Wada et al. | ............... | 310/316 |
| 5,315,680 | A | * | 5/1994 | Musk et al. | ............... | 385/29 |
| 5,610,369 | A | * | 3/1997 | Foss | ............... | 174/84 R |
| 5,825,954 | A | * | 10/1998 | Dunn et al. | ............... | 385/79 |
| 6,305,849 | B1 | * | 10/2001 | Roehrs et al. | ............... | 385/59 |
| 6,315,461 | B1 | * | 11/2001 | Cairns | ............... | 385/139 |
| 6,321,021 | B1 | * | 11/2001 | Cairns et al. | ............... | 385/135 |

FOREIGN PATENT DOCUMENTS

| CH | 671 187 | 12/1978 |
| EP | 0 166 636 A1 | 5/1985 |
| JP | 60-177897 | 9/1985 |
| JP | 63286299 | 5/1987 |
| JP | 11179600 | 6/1999 |

* cited by examiner

*Primary Examiner*—Brian Sircus
*Assistant Examiner*—Chandrika Prasad
(74) *Attorney, Agent, or Firm*—Roger C. Turner (57) ABSTRACT

An optical fibre connector element (10) receives at one end a sheathed optical fiber cable (12), and the individual optical fibers (14) are separated out within the connector element. Each of the individual optical fibers is terminated with a ferrule (16) at the cut end. The connector has an end face (20) which is provided with a transparent window (26), the ferrules (16) being positioned internally adjacent the window. The invention provides a single carrier component (60) for the window (26) and which includes an integral seal component (64). The end face is also provided with an O-ring seal (29) to provide a seal between two coupled connectors, and the O-ring seal (29) is housed frictionally in a channel (28) having tapered side walls (51,53). An improved ferrule carrier design is also disclosed in which a channel (54) is provided for each fiber having a guide ramp (60) which is arranged to direct the optical fiber radially out of the ferrule carrier during assembly so as to prevent damage to the fibers.

13 Claims, 5 Drawing Sheets

OPTICAL FIBRE CONNECTOR

This invention relates to an optical fibre connector arrangement.

A known connector element receives at one end a sheathed optical fibre cable, and the individual optical fibres are separated out within the connector element. Each of the individual optical fibres is terminated with a ferrule at the cut end. The ferrules butt against an expanded beam lens arrangement which enables the optical signals to bridge the gap between coupled connector elements.

It is known to provide an end face of the connector with a transparent window, and ferrules at the end of the individual fibres are positioned internally adjacent the window.

This window provides protection for the lens assemblies associated with the ferrules, and provides an easily cleanable surface. Conventionally, the window is arranged as an insert which is provided in a bezel component. A seal is first located in a recess of the bezel, and the window insert is then inserted over the seal. The bezel assembly is then screwed into a recess in the end face of the connector element with the window insert clamped against the end face of the connector element. This assembly operation is delicate and may be particularly difficult in a remote site and in adverse conditions. Thus, maintenance may be difficult.

The ferrules are typically carried by a ferrule carrier which retains the sheathed fibre cable at one end and an individual ferrule or ferrules at the other end. A problem with existing ferrule carriers for connector elements is that the during assembly of the connector element, the individual fibre or fibres are fed into the opening for the sheathed fibre cable, and then pushed along the ferrule carrier. If the ferrules at the end of the fibres catch any obstruction or else miss ferrule openings provided for them, the fibres may be caused to buckle, are difficult to extract and may become damaged. The assembly of the connector element therefore may result in damage of the fibres, which may or worse may not be detected.

It is also known to use hermaphroditic couplings, so that identical connector elements may be coupled together. It is known for such connector elements to be provided with O-ring seals at their end faces. When two identical connector elements are mated together, the seals are pressed against each other to provide a protected space which prevents dirt or moisture interfering with the optical path between the connector elements. Conventionally, the O-ring seals are glued into a recess in the end face of the connector element. However, it has been found that the rubber-to-rubber contact between the seals can result in the seals becoming detached more readily than experienced in a rubber-to-metal seal environment. To replace the seals is then difficult, because adhesive is required. The connector elements may be situated in remote locations, so it is desirable for maintenance to be as easy as possible.

According to a first aspect of the invention, there is provided an optical fibre connector element comprising a connector body which receives an optical fibre, the optical fibre terminating with a ferrule, the connector body having an end face which is provided with a transparent window, the ferrule being positioned internally adjacent the window, in which when two identical such connector elements are mated to connect optically the optical fibres the ferrules behind the windows are aligned, wherein the window is provided by an insert which is inserted into a recess in the end face, the insert comprising:

a moulded plastics carrier having an opening for the window and a set of openings for fixing screws;

a seal component which is overmoulded over the carrier and which lines the opening for the window and extends over the fixing screw openings;

a window component which is located in the window opening; and a set of fixing screws, wherein the seal component is for retaining the window component and the fixing screws in place to define a pre-assembled insert.

The invention in this first aspect provides a single carrier component which includes an integral seal component for the window. This seal enables the window and the screws to be held in place. Therefore, the insert may be assembled as a single component, so that all that is required on site to replace a damaged window is to undo the screws of the damaged insert, and do up the screws of the new pre-assembled window insert.

Preferably, the base is lined with the seal component such that when the window is initially placed in the opening it stands proud of the surface of the carrier. This enables the final position of the window to be determined by the components of the connector element, so that the window can be guaranteed to be perpendicular to the direction of propagation of the optical signals, which is desired for the window to have minimum effect on the signals.

The end face preferably further comprises a seal surrounding the insert, the seals of each connector butting against each other to provide a seal when two identical such connector elements are mated to connect optically the optical fibres. The windows are thus protected from damage and interference by moisture and particles.

According to a second aspect of the present invention, there is provided an optical fibre connector element comprising a connector body which receives an optical fibre, the body having an end face which is provided with an O-ring seal, in which when two identical such connector elements are mated to connect optically the optical fibres, the O-ring seals of each connector butt against each other to provide a seal, and wherein the O-ring seal is provided in a channel in the end face of body, the channel having opposed side walls with at least a portion of at least one of the side walls being tapered thereby enabling the O-ring seal to be retained frictionally in the channel.

The frictional engagement may be arranged to retain the seal more securely than the glued arrangement of the prior art. Furthermore, the replacement of the seal is facilitated.

Preferably, the optical fibre terminates with a ferrule, and the end face of the body is provided with a transparent window, the O-ring seal being disposed around the window and the ferrule being positioned internally adjacent the window. The seals thus provide protection for the windows, through which the optical signals pass.

According to a third aspect of the invention, there is provided an optical fibre connector element comprising:

a connector body which receives a sheathed optical fibre, the optical fibre terminating with a ferrule having a width greater than the width of the optical fibre;

a ferrule carrier provided within the body, the sheathed optical fibre being retained in a sheath opening at one end of the ferrule carrier and the optical fibre ferrule being located in a ferrule opening at the opposite end of the ferrule carrier, wherein a channel is provided between the sheath opening and the ferrule opening which acts as a guide passage for the optical fibre, and wherein the channel is provided with a guide ramp for directing the optical fibre radially out of the ferrule carrier, the guide ramp being provided with a slot having a width less that the width of the ferrule and greater than the width of the optical fibre.

The guide ramp ensures that the individual fibre or fibres are directed out of the ferrule carrier by guiding the ferrule at the end of the fibre, so that they are safe from damage. The slot enables the fibre then to be slid into place with the fibre located in the slot. This operation does not require significant bending of the fibre or fibres.

The ferrule openings are preferably provided at the end of a radial passage in an end face of the carrier, so that the ferrules may also be slid sideways into the ferrule openings.

In all aspects, the connector body may be provided with coupling means to enable two identical such connector elements to be mated to connect optically the optical fibres, for example a hermaphroditic bayonet fitting.

Figure 1:
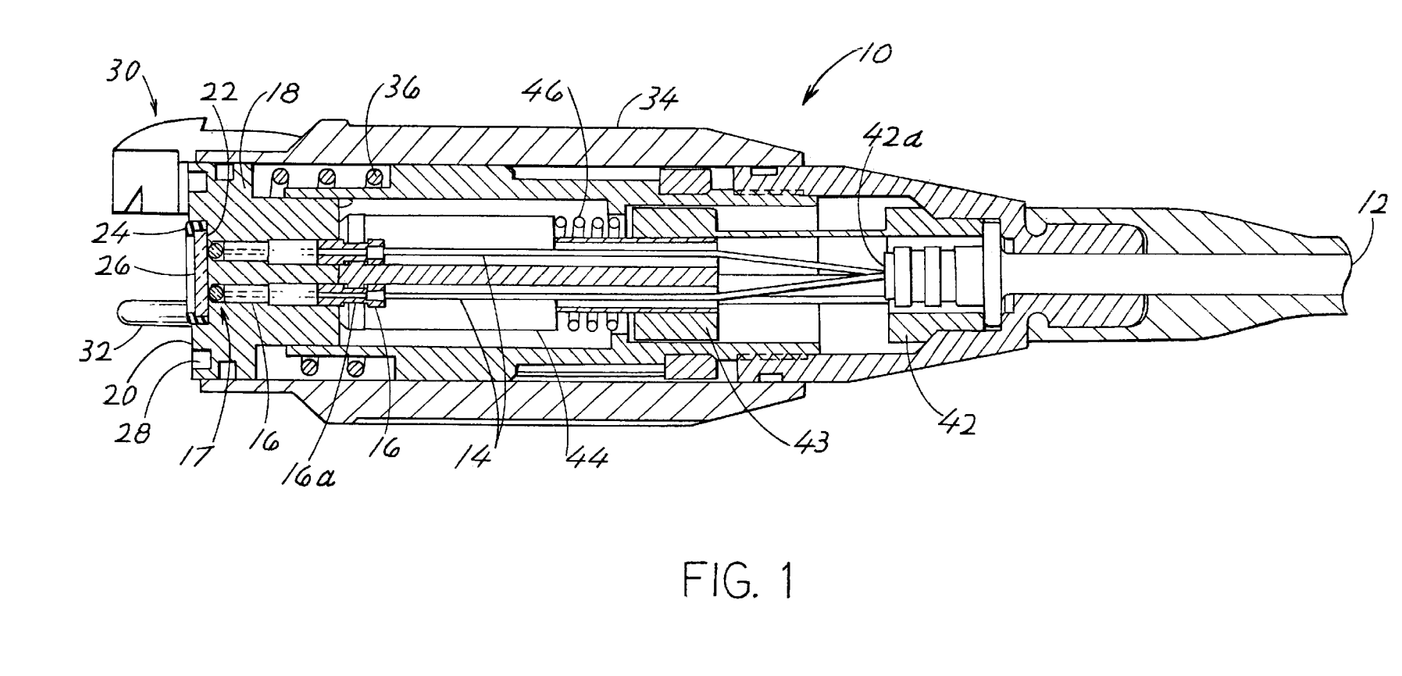
FIG. 1 is a sectional view of a connector element according to the invention.

An embodiment of the present invention will now be described by way of example with reference to the accompanying drawings, in which:

FIG. 1 shows a sectional view of a connector element 10, which is designed for connection to another identical connector element, so that optical signals may be transmitted along adjacent optical fibre sections.

The connector element 10 receives at one end a sheathed optical fibre cable 12, and the individual optical fibres 14 are separated out within the connector element 10. Each of the individual optical fibres 14 is terminated with a ferrule 16 at the cut end. The ferrules 16 butt against an expanded beam lens arrangement 17 which enables the optical signals to bridge the gap between coupled connector elements. The ferrules 16 are accurately located within an end block 18 which defines an end face 20 of the connector element 10. The end block 18 is provided with a recess 22 which receives an insert assembly 24 having a window 26. The window 26 provides a surface which is perpendicular to the longitudinal axis of the connector element 10 against which the lens assembly 17 is positioned. The window 26 is sealed into the insert assembly 24 so that the window provides protection for the lens assemblies 17 and provides an easily cleanable surface. The end block 18 is provided with a second annular recess 28 in which an O-ring seal (not shown in FIG. 1) is located.

To enable two identical connector elements 10 to be coupled together, a hermaphroditic bayonet fitting is provided, which is indicated generally at 30. A more detailed description of the bayonet coupling is described further below.

When two such connector elements are coupled together by the bayonet fittings 30, the O-ring seals located in the recesses 28 butt against each other to provide a seal for protecting the windows 26 of the two connectors 10. The end block 18 is provided with an alignment pin 32 and a recess (not shown), so that when two connectors 10 are coupled together, the alignment pin 32 of one enters the recess of the other, and vice versa. In this way, accurate alignment of the ferrules between coupled connectors can be achieved.

As described above, the coupling arrangement is a bayonet fitting. As a result, at an intermediate stage of the coupling of two connector elements, the two connector elements are brought closer together than in the final connected state. To ensure that the end faces 20 are mated together when two connector elements 10 are coupled together, the end blocks 18 are arranged to be depressible into the main body 34 of the connector element 10. Thus, during the engagement of the bayonet fitting, the end blocks 18 become depressed into the body of the connector element, but once the latching engagement of the bayonet has been achieved, the end blocks 18 are biased to press against each other. For this purpose, a first spring 36 is provided which biases the end block 18 towards the end of the connector element 10. The end block is prevented from detaching from the main body 34 of the connector element by any suitable means, such as a pin and slot arrangement enabling limited sliding movement of the end block relatively to the remainder of the connector body.

Before engagement of the bayonet fitting, the pins 32 and recesses have been coupled, so that relative rotation of the two end blocks 18 is not possible. Therefore, the end blocks 18 are rotatably housed within the main body 34 so that the bayonet coupling may be achieved with the end blocks rotationally stationary with respect to each other.

When the end block 18 is depressed during coupling of the bayonet fitting, the optical fibres 14 will bow slightly, and the overall length of the connector element 10 is selected to accommodate this slight bowing of the optical fibres 14.

The exposed individual optical fibres are housed in a ferrule carrier, which for the purposes of this description is taken to comprise a first component 42 which grips the sheathed end of the optical fibre cable and a second component 44 by which the ferrules 16 are located. Thus, the first component 42 includes a sheath opening 42a at one end of the ferrule carrier, and the second component 44 includes ferrule openings at the other end of the ferrule carrier. The second component 44 is arranged to butt against the end block 18 and grips a neck part 16a of the ferrules 16.

When the end block 18 is depressed into the body of the connector element 10, the two ends 42, 44 of the ferrule carrier need to displace towards each other. This displacement is against the bias of a second spring 46 which ensures that the second component 44 is maintained in the position in which it butts against the end block 18. The first and second components 42, 44 may be assembled together to form the ferrule carrier, which may be inserted into the main body 34 of the connector element 10 as a single unit. For this purpose pin and slot connections may again be provided between the first and second components 42, 44 enabling limited sliding between the two components.

To assemble the connector element, the individual optical fibres 14 are cut to the appropriate length, and the ferrules are attached at the ends. The individual fibres are fed into the ferrule carrier through the sheath opening 42a in the first component 42. The individual fibres 14 are fed along the ferrule carrier and eventually the ferrules 16 are located in the ferrule openings in the second component 44. The optical lens assemblies 17 are placed in the openings of the end block 18, and there may also be provided spacers between the lens assemblies and the ferrules. The ferrules 16 are then fed into the openings in the end block 18 during assembly of the remaining parts of the connector element 10.

Figure 2:
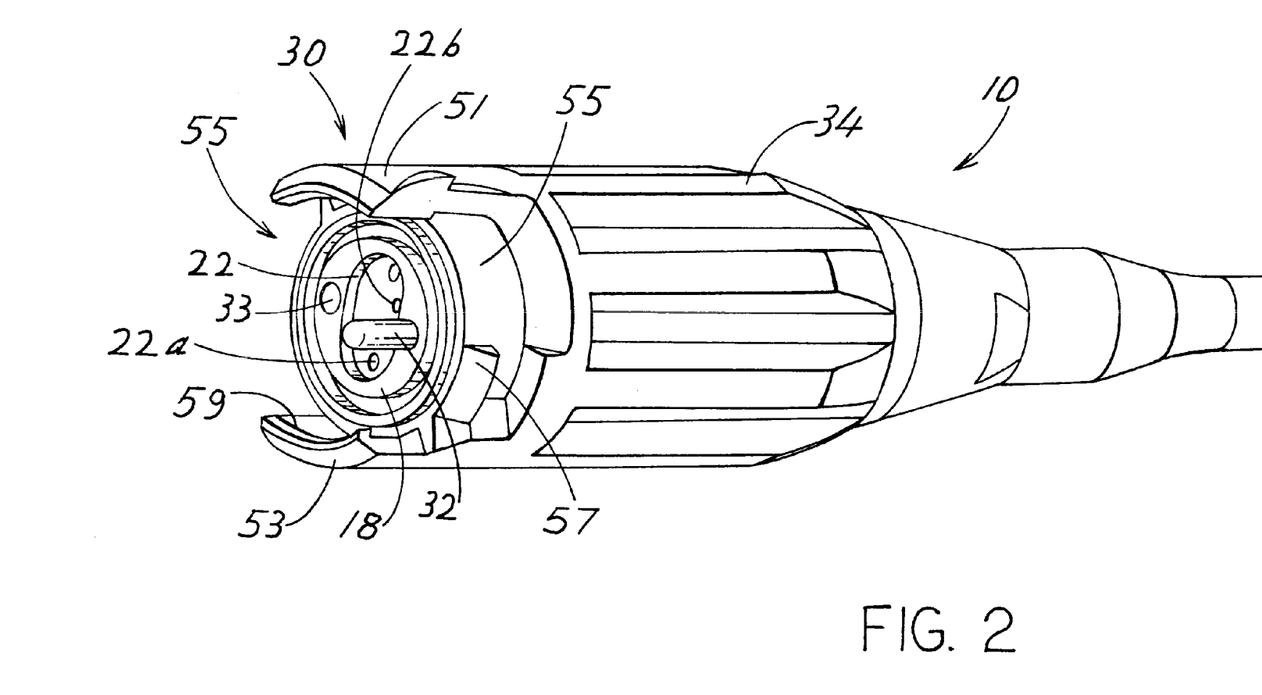
FIG. 2 shows in greater detail the coupling mechanism which enables two identical connector elements to be coupled together.

FIG. 2 shows in greater detail the hermaphroditic bayonet fitting 30 which enables identical connector elements 10 to be coupled together. The fitting 30 includes two diametrically opposed connection arms 50, 52 and when two connectors 10 are coupled together, the arms 50, 52 of one connector are positioned in the gaps 54 between the arms of the other connector. The gaps 54 are provided with a latch arrangement 56 which cooperates with an engagement surface 58 of the arms 50 to provide the bayonet coupling. When the two connector elements 10 are initially brought together, the pin 32 of one enters the opening 33 of the other. During the bayonet coupling operation, the end block 18 rotates within the main body 34 and correct alignment between the ferrules of each connector element 10 is provided at all times. Thus, during connection of two connector elements 10, there is no relative rotational movement between the end faces 20 of the end blocks 18. However, a connector element 10 may also be coupled to a cover plate which simply acts as a protective covering over the connector element 10. Such a cover plate also includes an O-ring seal, but which typically is not provided in a rotatable component. Thus, when securing an end plate to the connector element 10, there will be relative rotational movement between the seals of the end plate and of the connector element 10.

To the extent described above, the connector element assembly is known, and has been manufactured by the applicant. The invention provides additional features some of which are shown in FIGS. 1 and 2, but which have not been described above.

Figure 3:
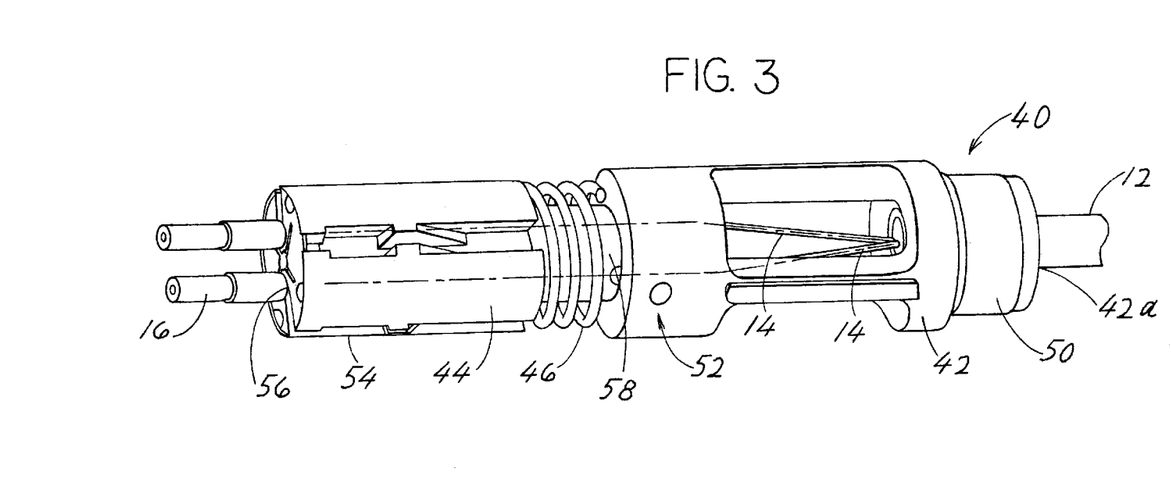
FIG. 3 shows in greater detail the ferrule carrier in the connector element of the invention.

FIG. 3 shows in greater detail the design of the ferrule carrier used in the connector of the invention. The ferrule carrier comprises the components 42 and 44 in FIG. 1. As shown in greater detail in FIG. 3, the first component 42 of the ferrule carrier 40 comprises a hollow body with a crimp 50 at one end for gripping the sheathed fibre cable 12. The crimp 50 has a sheath opening for the end of the sheathing, so that the individual fibres 14 pass through the inside of the component 42. A pin and slot arrangement is shown schematically as 52 for providing limited sliding movement between the first and second components 42, 44.

The second component 44 comprises includes a number of guide channels 54 arranged in the outer surface. These channels thus extend partly between the sheath opening and ferrule openings 56 provided at the opposite end of the ferrule carrier 40 in an end face of the second component 44. The channels 54 act as guide passages for the optical fibres. The optical fibres with their ferrules 16 attached are fed into the sheath opening 42a and pass from the first component 42 into the channels 54. As shown in FIG. 1, the channels 54 almost reach the centre of the second component 44. Therefore, the fibres 14 pass through the middle of the sliding connection 58 between the first and second components 42, 44 and then enter the channels 54.

Each channel 54 is provided with a guide ramp 60 for directing the optical fibre radially out of the ferrule carrier 40. The guide ramp 60 is provided with a slot 62 having a width less that the width of the ferrule 16 and greater than the width of the optical fibre 14. Therefore, as a fibre 14 is pushed along a respective channel 54, the guide ramp 60 causes the ferrule to be deflected out of the carrier 40, because the slot 62 is too narrow for the ferrule to pass through. The assembler can thus support the fibre or fibres to prevent any damage being caused.

The slotted ramp arrangement prevents the ferrules from catching any obstruction thereby preventing the fibres from damage. The assembly of the connector element is also easier since there is no longer the need to steer accurately the individual fibres though openings in the end face 64 of the ferrule carrier, as in the past. The ramp may have any suitable form for directing the fibres 14 out of the ferrule carrier.

Once the fibres have been fully inserted, so that the crimp 50 is correctly positioned, the fibres may be delicately moved in to place. For this purpose, an end face 64 of the second component 44 may be provided with radial slots 66 so that the fibres can be positioned from the side. The width of the slots can correspond to the size of the neck part 16a (FIG. 1) of the ferrules, so that longitudinal sliding of the fibres 14 and ferrules with respect to the second component 44 is prevented. In this case, the length of the protruding part of the ferrule is designed to correspond to the depth of the openings in the end block 18, so that the ends of the ferrules butt against the optical lens assembly 17, and the lens assembly 17 butts against the window 26 either directly or though a positioning component.

Alternatively, the neck may have a slightly greater width, so that a spring component 68 may be provided at the end face 64. This spring component provides a biasing force to the ferrules, and in the particular example shown, this force acts against the shoulder which defines the neck portion 16a. The spring component shown in FIG. 4 comprises a flat spring which is sectioned using slots 70 so that individual parts of the flat spring act on individual ferrules. In this way, the positioning of each individual ferrule is controlled in such a way that each ferrule butts against the associated lens assembly, and each lens assembly 17 butts against the window 26.

Figure 4:
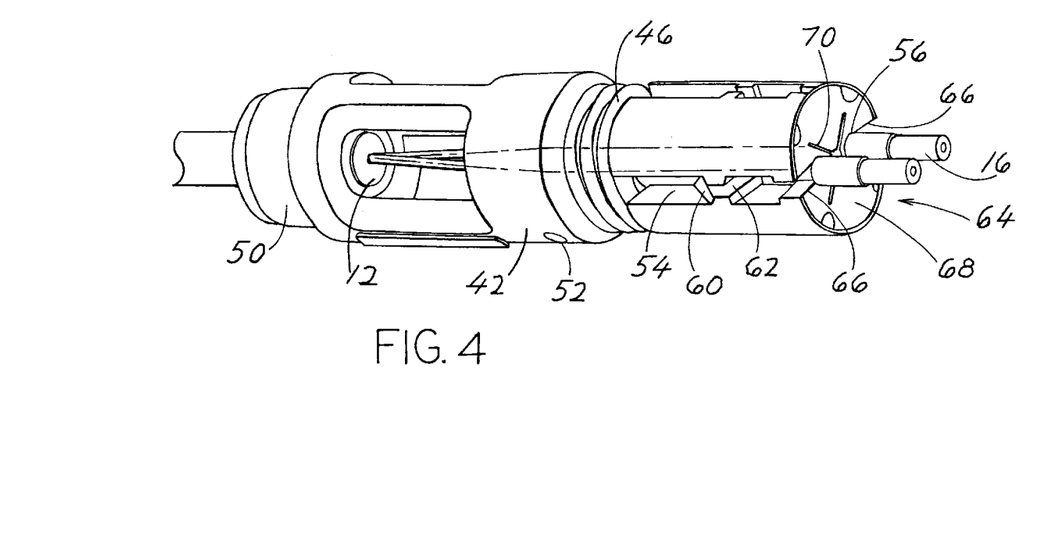
FIG. 4 shows a different view of the ferrule carrier of FIG. 3.

The flat spring component enables an individual component to provide an independent biasing force against each ferrule, thereby reducing the number of components. However, individual springs may alternatively be employed. The individual control of the ferrule positions may be required either as a result of inaccuracies in the lengths to which the optical fibres 14 are cut, or as a result of the movements which take place during the coupling of connector elements.

Figure 5:
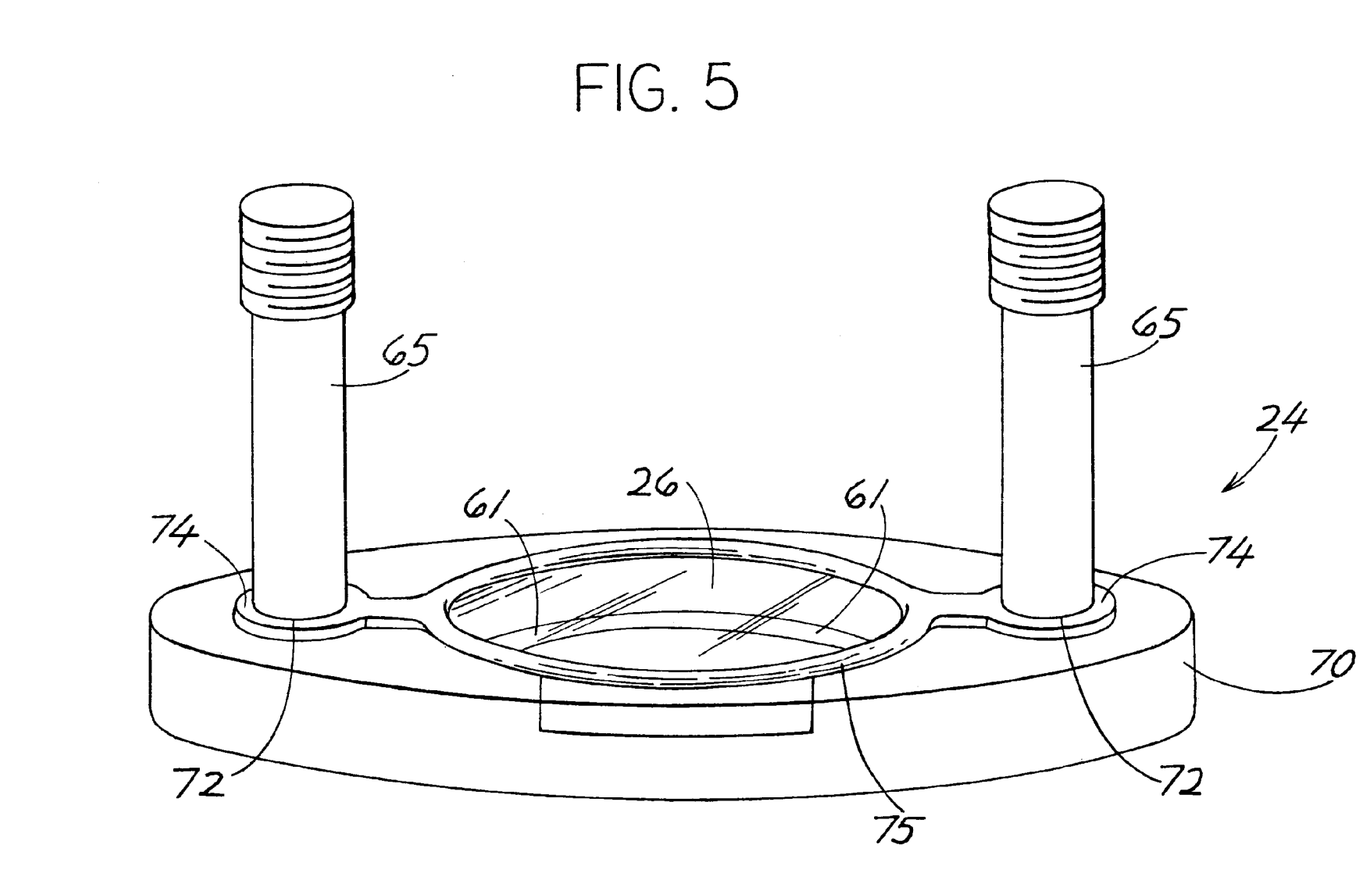
FIG. 5 shows a window insert used in the connector element of FIGS. 1 and 2.

The spring arrangement may enable the lengths of the optical fibres 14 to be less critical, since any difference in length will be accommodated FIG. 5 shows in greater detail the insert assembly (24 in FIG. 1) used in the connector of the invention. As shown in FIG. 5, the insert comprises a moulded plastics carrier 60 in the form of a bezel having an opening for the window and a set of openings 62 for fixing screws 65. The window opening includes a base 61 so that the window can be supported in the window opening.

As part of the moulding process of the carrier 60, a seal component 64 is overmoulded over the carrier. The seal component may comprise a fluorosilicone seal which lines the window opening and extends over the fixing screw openings 62.

The insert assembly 24 is pre-assembled so that no assembly of small components is required on site during maintenance. The plastics or glass window 26 is positioned in the window opening. The window 26 sits on the base 61, and the sizing of the overmoulded seal 64 is such that the window can be retained by insertion into the opening, by an interference fit. Thus, insertion of the window 26 may result in seal material effectively flowing around the edge of the window 26 to encompass and retain the window.

The seal component 64 also extends at least partially over the fixing screw openings 62. There may be an opening in the centre of the seal web over the screw openings 62, or else insertion of the screws may be relied upon to form those openings. The effect of these webs is to retain the fixing screws in place as part of the pre-assembled insert 24.

The window 26 stands proud of the surface of the carrier 60 in the pre-assembled form. The final position of the window is therefore determined by the engagement of the window with the recess 22 (in FIGS. 1 and 2) of the end block 18. The end block 18 may be machined very accurately, for example from metal, to ensure that the window is perpendicular to the direction of optical signal communication. This is desirable for minimum signal loss. Also, the screwing of the insert 24 into the recess 22 of the end block 18 results in some deformation of the portions of the seal component 64 around the base of the screws 65. In this way, these portions of the seal component 64 may perform a self-locking function for the screws, preventing them from become undone accidentally.

As shown in FIG. 2, the bottom of the recess 22 comprises a flat surface with threaded openings 22a for the fixing screws and openings 22b for the ferrule 16 and lens assembly 17 arrangements. The opening 22 thus provides a large surface against which the window 26 is clamped when the pre-assembled insert 24 is screwed in.

Figure 6:
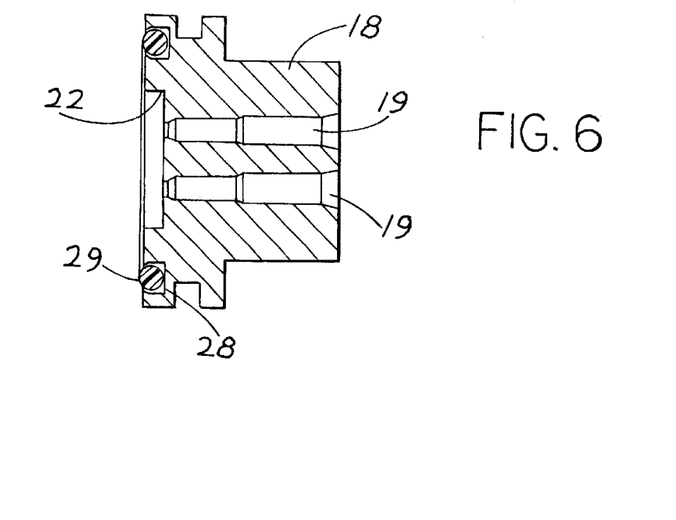
FIG. 6 shows in cross section the end block of the connector element of FIG. 1.
Figure 7:
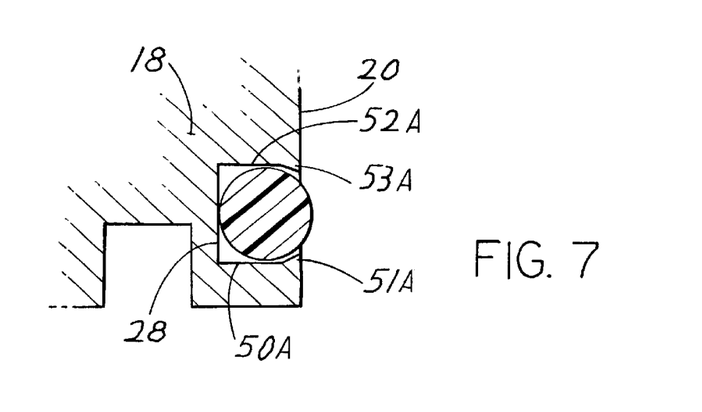
FIG. 7 shows the seal and seal channel of the end block of FIG. 6 enlarged for clarity.
Figure 8:
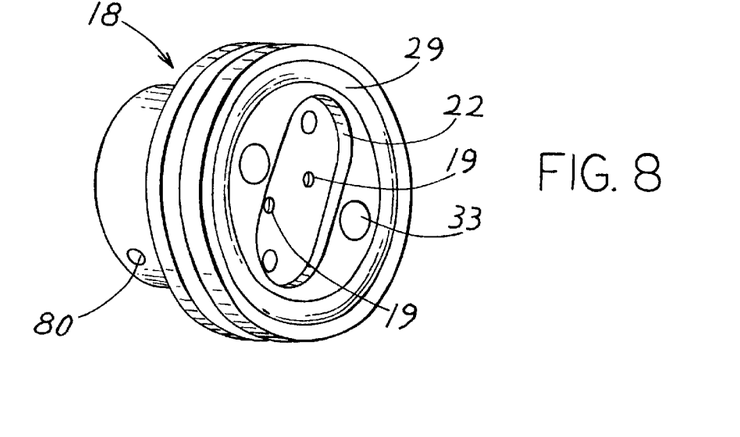
FIG. 8 shows in perspective view the end block of FIGS. 6 and 7.

FIGS. 6 to 8 show in greater detail the end block (18 in FIG. 1) used in the connector of the invention. The openings 19 for the ferrules and optical lens assemblies are shown in FIG. 6, and the seal 29 is shown in place. The annular channel 28 has concentric side walls 50, 52 as shown in FIG. 7, which include tapered portions 51, 53. These tapered portions enable the seal 29 to be retained frictionally in the channel 28, enabling the use of adhesive to be avoided. This makes seal replacement easier. Furthermore, the geometric design of the channel enables the seal to retained in position more securely than in previous bonded systems.

As explained above, the attachment of a protective end cap to the connector element 10 may give rise to sliding between the seals of the connector element 10 and the end cap. This may a contributory factor in the failure of the seals. The seal arrangement may permit the seal 29 to rotate within the channel, but still to be retained longitudinally. This reduces the stresses on the seal material when fitting an end cap.

The seal channel 28 may be designed with any suitable configuration, provided at least one of the side walls is provided with a tapered portion which provides a narrowed entry to the channel, so that the channel entry is narrower than the seal width. The seal is compressed to enter the channel, but once captivated by the channel resumes its normal shape, with a portion of the seal protruding beyond the end face 20 of the end block 18 as shown in FIG. 7.

FIG. 8 shows the end block of FIGS. 6 and 7 in perspective view, and shows more clearly the recess 22. The pin 32 is omitted for clarity. An opening 60 is also shown which is part of the arrangement allowing relative sliding between the end block 18 and the body 34 of the connector element 10.

The invention in its various aspects simplifies maintenance of installed optical fibre connectors. Various modifications will be apparent to those skilled in the art.

What is claimed is:

1. An optical fibre connector element comprising a connector body which receives an optical fibre, the optical fibre terminating with a ferrule, the connector body having an end face which is provided with a transparent window, the ferrule being positioned internally adjacent the window, in which when two identical such connector elements are mated to connect optically the optical fibres the ferrules behind the windows are aligned, wherein the window is provided by an insert which is inserted into a recess in the end face, the insert comprising:

a moulded plastics carrier having an opening for the window and a set of openings for fixing screws;

a seal component which is overmoulded over the carrier and which lines the opening for the window and extends over the fixing screw openings;

the window component which is located in the window opening; and a set of fixing screws, wherein the seal component is for retaining the window component and the fixing screws in place to define a pre-assembled insert.

2. An optical fibre connector element as claimed in claim 1, in which the window opening has a base such that the when the window is placed in the opening it is retained by the base.

3. An optical fibre connector element as claimed in claim 2, wherein the base is lined with the seal component such that when the window is initially placed in the opening it stands proud of the surface of the carrier.

4. An optical fibre connector element as claimed in claim 3, wherein the insert is screwed to the end face of the connector body, the window component thereby becoming flush with the surface of the carrier.

5. An optical fibre connector element as claimed in claim 1, the end face further comprising a seal surrounding the insert, the seals of each connector butting against each other to provide a seal when two identical such connector elements are mated to connect optically the optical fibres.

6. An optical fibre connector element comprising a connector body which receives an optical fibre, the body having an end face which is provided with an O-ring seal, in which when two identical such connector elements are mated to connect optically the optical fibres, the O-ring seals of each connector butt against each other to provide a seal, and wherein the O-ring seal is provided in a channel in the end face of the body, the channel having opposed side walls with at least a portion of at least one of the side walls being tapered thereby enabling the O-ring seal to be retained frictionally in the channel.

7. An optical fibre connector element as claimed in claim 6, wherein the optical fibre terminates with a ferrule, and wherein the end face of the body is provided with a transparent window, the O-ring seal being disposed around the window and the ferrule being positioned internally adjacent the window.

8. An optical fibre connector element as claimed in claim 6, wherein the body receives two or more optical fibres arranged as a sheathed optical fibre cable.

9. An optical fibre connector element comprising:

a connector body which receives a sheathed optical fibre, the optical fibre terminating with a ferrule having a width greater than the width of the optical fibre;

a ferrule carrier provided within the body, the sheathed optical fibre being retained in a sheath opening at one end of the ferrule carrier and the optical fibre ferrule being located in a ferrule opening at the opposite end of the ferrule carrier, wherein a channel is provided between the sheath opening and the ferrule opening which acts as a guide passage for the optical fibre, and wherein the channel is provided with a guide ramp for directing the optical fibre radially out of the ferrule carrier, the guide ramp being provided with a slot having a width less that the width of the ferrule and greater than the width of the optical fibre.

10. An optical fibre connector element as claimed in claim 9, wherein a plurality of optical fibres are provided within the sheath, each terminating with a respective ferrule, a respective ferrule opening and channel being provided for each optical fibre.

11. An optical fibre connector as claimed in claim 9, wherein the ferrule opening or openings are provided at the end of a radial passage in an end face of the ferrule carrier.

12. An optical fibre connector element as claimed in claim 1, wherein the connector body is provided with coupling means to enable two identical such connector elements to be mated to connect optically the optical fibres.

13. An optical fibre connector element as claimed in claim 12, wherein the coupling means comprises a hermaphroditic bayonet fitting.

* * * * *